No. 878,774. PATENTED FEB. 11, 1908.
C. R. COFFMAN.
PLOW.
APPLICATION FILED MAY 24, 1907.
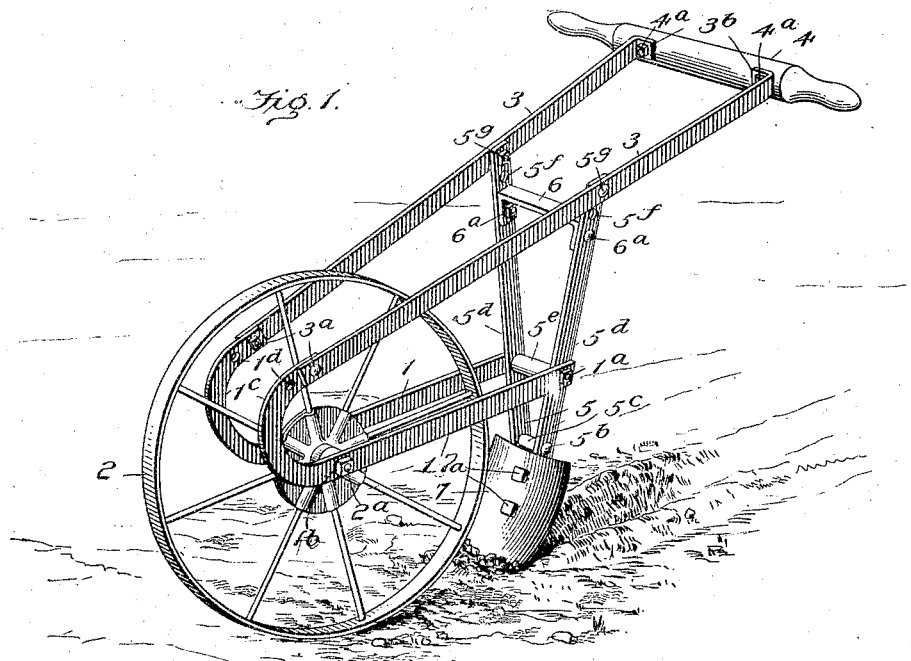
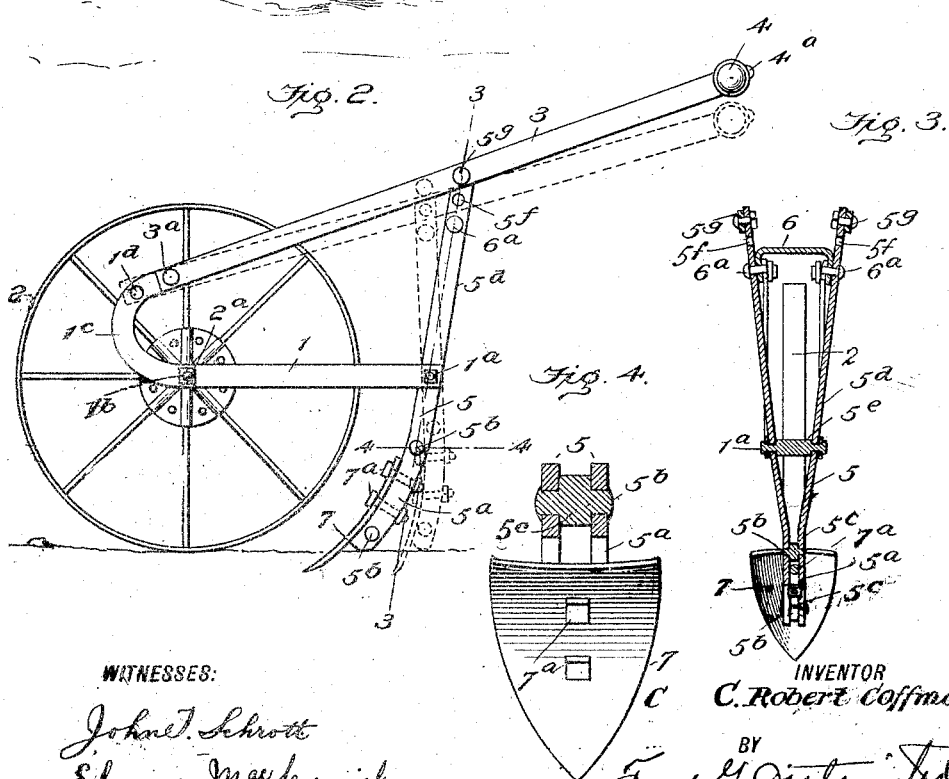
WITNESSES:
John T. Schrott
Eleanor MacCormick
INVENTOR
C. Robert Coffman
BY
Fred G. Dieterich & Co.
ATTORNEYS

UNITED STATES PATENT OFFICE.

CHARLES R. COFFMAN, OF BRIDGEWATER, VIRGINIA, ASSIGNOR TO D. SAYLOR THOMAS, OF BRIDGEWATER, VIRGINIA.

PLOW.

No. 878,774.  Specification of Letters Patent.  Patented Feb. 11, 1908.

Application filed May 24, 1907. Serial No. 375,381.

*To all whom it may concern:*

Be it known that I, CHARLES ROBERT COFFMAN, residing at Bridgewater, in the county of Rockingham and State of Virginia, have invented certain new and useful Improvements in Plows, of which the following is a specification.

My invention relates to certain new and useful improvements in garden plows, and particularly has for its object to provide a plow of this character, of a very simple and effective construction, which can be easily and cheaply manufactured and which will readily and effectively serve its intended purposes.

In its generic nature the invention embodies a plow having a pair of horizontally disposed side bars forming a beam member, between which the ground wheel is mounted and which have their front ends curved upwardly and provided with a series of apertures to which the rearwardly and divergingly extending handle bars are adjustably secured and the handle bars are connected by the usual handle at their rear ends.

A pair of downwardly converging substantially vertically disposed plow carrying standards are adjustably secured to the handle bars and pivotally secured at the rear ends to the side bars. At the upper ends the standards are braced by transverse bars and at the lower ends are spaced apart by collars and bolts and are adapted to receive the plow share or other working implement which is adapted to be detachably secured thereto.

My invention also has for its object to provide such a plow which can be adjusted to change the draft of the plow at will and depending upon the different kinds of soil operated upon.

With other objects in view than have been heretofore specified, the invention consists of certain details of construction and operation, all of which will be first described in detail, and then be specifically pointed out in the appended claims, reference being had to the accompanying drawings, in which:—

Figure 1, is a perspective view of my invention. Fig. 2, is a side elevation thereof, showing the position of the parts adjusted for one draft in full lines and adjusted for a change of draft in dotted lines. Fig. 3, is a cross section on the line 3—3 of Fig. 2. Fig. 4, is a similar view on the line 4—4 of Fig. 2.

Referring now to the accompanying drawings in which like numerals and letters of reference indicate like parts in all of the figures, 1 designates the side beams or bars which are connected together at their rear ends by the bolt $1^a$ and are provided with the axle apertures $1^b$ to receive the ground wheel axle $2^a$ on the ground wheel 2, as shown.

The side bars 1 are arranged substantially parallel to one another and have their front ends upwardly and divergingly curved in approximately semi-circular form as shown at $1^b$ and the upper ends of the curved portions $1^b$ terminating in a series of apertures $1^d$ to receive the securing bolts $3^a$ of the handle bars 3 which are adjustably bolted to the curved portions $1^c$ through the apertures $1^d$ and diverging rearwardly where they terminate in right angled portions $3^b$ through which the bolts $4^a$ that secure the handle 4 to the handle bars pass.

5—5 designates substantially vertically disposed supports which form what I term the plow carrying standard and the supports 5 at their lower ends are provided with parallelly disposed portions $5^a$ spaced apart by the bolts or rivets $5^b$ and sleeves $5^c$ and from the parallelly disposed portions $5^a$, the supports 5 diverge upwardly as at $5^d$, passing between the rear ends of the side bars or beams 1 and are secured in place by bolts $1^a$, the spacing sleeves $5^e$ being provided between the bars $5^b$.

At their upper ends the supports 5 are provided with a series of adjusting apertures $5^f$ through which the bolts $5^g$ which secure the upper ends of the supports 5 to the handle bars 3 pass.

The supports 5 at their upper ends are spaced apart and braced by a transverse bridge member 6, bolted to the supports by the bolts $6^a$, as shown.

7 designates the plow or other working implement which is adjustably secured between the parallel portions $5^a$ of the plow standard by bolts $7^a$ that pass between the bolts $5^b$ and the parallel portions of the plow standard at the lower end.

As shown in full lines in Fig. 2 and as shown in Fig. 1, when the parts are in the position therein shown the plow will be held at the angle to the ground as shown in Fig. 2 in full lines, and when the parts are in the position shown in dotted lines in Fig. 2 the angle at which the plow is held to the ground will be correspondingly changed, thus changing the draft. The angle at which the handle bars are held with respect to the ground may be also changed by changing the connection between the plow standard and the handle bars to cause the connecting bolts to pass through different apertures from that shown in Figs. 1 and 2 of the drawings as will be readily understood by reference to the drawings.

From the foregoing description taken in connection with the accompanying drawings, it is thought the complete construction, operation and arrangement of parts will be readily understood by those skilled in the art to which the invention appertains.

What I claim is:

In a plow, the combination with a beam member comprising a pair of parallel side bars spaced apart, of a wheel journaled to and between said side bars, the front portion of said side bars being bent upwardly and divergingly into a semi-circular portion, the ends of which are provided with a series of apertures, handle bars pivoted to the apertured portions of said beam ends, a standard comprising a pair of bars spaced apart and parallel to one another at the bottom portion and diverging from the parallel portion upwardly, means for pivotally securing said bars to the rear ends of said beam bars and also serving to space said standard bars apart, means for adjustably securing said standard bars to the respective handle bars, said standard bars having a series of adjusting apertures in their upper ends, and a plow secured to the lower end of the standard, substantially as shown and described.

C. R. COFFMAN.

Witnesses:
D. S. LONG,
J. T ROBSEN.